US011415100B2

(12) United States Patent
Altmikus

(10) Patent No.: US 11,415,100 B2
(45) Date of Patent: Aug. 16, 2022

(54) ROTOR BLADE FOR A WIND TURBINE AND WIND TURBINE

(71) Applicant: Wobben Properties GmbH, Aurich (DE)

(72) Inventor: Andree Altmikus, Aurich (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 16/615,664

(22) PCT Filed: May 7, 2018

(86) PCT No.: PCT/EP2018/061660
§ 371 (c)(1),
(2) Date: Nov. 21, 2019

(87) PCT Pub. No.: WO2018/224225
PCT Pub. Date: Dec. 13, 2018

(65) Prior Publication Data
US 2020/0208604 A1 Jul. 2, 2020

(30) Foreign Application Priority Data
Jun. 9, 2017 (DE) .................. 10 2017 112 742.9

(51) Int. Cl.
F03D 1/06 (2006.01)

(52) U.S. Cl.
CPC ......... F03D 1/0641 (2013.01); F03D 1/0683 (2013.01)

(58) Field of Classification Search
CPC .... F03D 1/0633; F03D 1/0641; F03D 1/0675; F03D 1/0683; F05B 2240/30; F05B 2240/301; Y02E 10/72
See application file for complete search history.

(56) References Cited

U.S. PATENT DOCUMENTS 1,501,248 A * 7/1924 Strong .................... B64C 11/16
416/1
2,135,887 A * 11/1938 Fairey .................... B64C 11/16
416/23
(Continued)

FOREIGN PATENT DOCUMENTS

CN 102094765 A 6/2011
DE 102011056108 A1 6/2012
(Continued)

Primary Examiner — David E Sosnowski
Assistant Examiner — Wayne A Lambert
(74) Attorney, Agent, or Firm — Seed Intellectual Property Law Group LLP

(57) ABSTRACT

A rotor blade for a wind turbine, to a wind turbine comprising a tower, a nacelle and a rotor, and also to a wind farm. The rotor blade comprises an inner blade section that extends from a rotor blade root in the longitudinal direction of the rotor blade, and a trailing edge segment, arranged on the inner blade section, for increasing the profile depth of the rotor blade along a section in the longitudinal direction of the rotor blade. The rotor blade has a pressure-side surface and a suction-side surface, which are each formed in certain regions by parts of the inner blade section and of the trailing edge segment. One or more air outlets and air inlets extending substantially in the longitudinal direction of the rotor blade are formed on both the pressure-side surface and the suction-side surface of the rotor blade, in the region of the trailing edge segment, said air outlets and air inlets being interconnected in a fluid-guiding manner. At least one covering element overlapping the at least one air outlet and by means of which the air outlet can be closed or opened is arranged on the suction-side surface.

18 Claims, 5 Drawing Sheets

(56) References Cited

U.S. PATENT DOCUMENTS

| | | | | |
|---|---|---|---|---|
| 2,507,611 | A * | 5/1950 | Pappas | B64C 21/02 244/198 |
| 3,144,220 | A * | 8/1964 | Kittelson | B64C 23/00 244/203 |
| 3,298,636 | A * | 1/1967 | Arnholdt | B64C 23/005 244/198 |
| 4,146,197 | A * | 3/1979 | Grotz | B64C 21/02 244/12.5 |
| 4,976,349 | A * | 12/1990 | Adkins | B64C 9/38 244/207 |
| 5,294,080 | A * | 3/1994 | Ross | B64C 9/14 244/215 |
| 5,697,468 | A * | 12/1997 | Russell, Jr | B60V 1/22 180/116 |
| 6,905,092 | B2 * | 6/2005 | Somers | B64C 3/14 244/3 |
| 6,984,110 | B2 * | 1/2006 | Jang | F03D 7/0236 416/23 |
| 7,143,983 | B2 * | 12/2006 | McClure | B64C 15/14 244/204 |
| 7,354,247 | B2 * | 4/2008 | Bonnet | F03D 15/05 415/905 |
| 7,832,689 | B2 * | 11/2010 | Prince | F03D 1/0641 244/200.1 |
| 7,946,803 | B2 * | 5/2011 | Wobben | F03D 1/0683 415/4.3 |
| 8,016,560 | B2 * | 9/2011 | McGrath | F03D 1/0683 416/91 |
| 8,128,364 | B2 * | 3/2012 | Pesetsky | F03D 1/0675 416/91 |
| 8,133,008 | B2 * | 3/2012 | Tsuchiya | F01D 5/145 416/232 |
| 8,246,311 | B2 | 8/2012 | Pesetsky | |
| 8,449,255 | B2 * | 5/2013 | Tadayon | F16H 1/28 416/37 |
| 8,475,129 | B2 | 7/2013 | Haans et al. | |
| 8,763,959 | B2 * | 7/2014 | Shepshelovich | B64C 3/14 244/215 |
| 9,194,369 | B2 * | 11/2015 | Dixon | F03D 7/022 |
| 9,523,279 | B2 * | 12/2016 | Herr | F01D 5/12 |
| 10,077,757 | B2 | 9/2018 | Kannenberg et al. | |
| 10,473,085 | B2 * | 11/2019 | Spieth | F03D 1/0675 |
| 2011/0103952 | A1 * | 5/2011 | Pesetsky | F03D 1/06 416/1 |
| 2011/0135477 | A1 | 6/2011 | Mohammed et al. | |
| 2011/0142636 | A1 * | 6/2011 | Curtin | F03D 1/0675 416/62 |
| 2011/0142638 | A1 | 6/2011 | McGrath et al. | |
| 2011/0206507 | A1 | 8/2011 | Bhaisora et al. | |
| 2013/0330194 | A1 | 12/2013 | Jacobsen et al. | |
| 2016/0177922 | A1 | 6/2016 | Rodriquez et al. | |
| 2017/0268480 | A1 * | 9/2017 | Gertz | F03D 1/0633 |
| 2020/0149507 | A1 * | 5/2020 | Arce | F03D 1/0675 |

FOREIGN PATENT DOCUMENTS

| | | | | |
|---|---|---|---|---|
| DE | 102011050661 | A1 | 11/2012 | |
| DE | 102014205016 | A1 | 9/2015 | |
| EP | 2514961 | A1 * | 10/2012 | F03D 1/065 |
| EP | 2527642 | B1 * | 7/2015 | F03D 1/0641 |
| EP | 2998572 | A1 * | 3/2016 | F03D 7/022 |
| RU | 2588311 | C2 | 6/2016 | |
| WO | 2007/035758 | A1 | 3/2007 | |
| WO | 2014/064626 | A2 | 5/2014 | |
| WO | WO-2019105517 | A1 * | 6/2019 | F03D 1/0641 |

\* cited by examiner

ROTOR BLADE FOR A WIND TURBINE AND WIND TURBINE

BACKGROUND

Technical Field

The invention relates to a rotor blade for a wind turbine. The invention also relates to a wind turbine having a tower, a nacelle and a rotor, and to a wind farm.

Description of the Related Art

In the prior art, it is known to improve the efficiency of the wind turbine by means of the design of the rotor blades on a wind turbine. One option for increasing the efficiency or power capacity of the wind turbine is to increase the chord length of the rotor blade profile in the region of the rotor blade root. To that end, the chord length, which is understood hereinafter as the length of the profile essentially perpendicular to the rotor blade longitudinal direction, that is to say the distance between a leading edge and a trailing edge of the rotor blade, is to be made as great as possible. The rotor blade root refers to that region of the rotor blade by means of which the rotor blade is attached to the rotor hub of the wind turbine. In a rotor blade of that kind, the maximum chord length is often very close to the rotor blade root. This reduces vortex generation and increases the efficiency of the wind turbine. The maximum chord length is restricted for example by transport limitations.

Another option for increasing efficiency is to influence the boundary layer, which is increasingly significant owing to increasing chord lengths. The generally convex curvature of the suction-side face of the rotor blade means that, downstream of the point of maximum curvature in the rear region of the rotor blade profile, the air flow on the suction side has to flow against a pressure gradient. This slows down the air flow, and as a consequence the boundary layer loses kinetic energy. In certain circumstances, the slowing of the air flow results in the boundary layer starting to detach from the surface of the rotor blade. A flow that has detached from the rotor blade surface leads to turbulence, and as a consequence the lift generated on the suction side drops and therefore the drag increases. Influencing the boundary layer is intended, in particular, to avoid the air flow detaching from the surface of the rotor blade.

It is known from the prior art, for example DE 10 2011 050 661 A1, in particular in order to comply with transport dimensions, to give the rotor blade a blunt trailing edge in the root region. In the region of the trailing edge, there is provided a boundary layer aspiration system in the form of a row of holes running along the trailing edge. The aspirated air is transported, by means of an air-conveying duct running in the longitudinal direction within the rotor blade, from the blade root toward the blade tip, and is discharged through an ejection region at the trailing edge of the blade tip. For that purpose, use is made of conveying means arranged within the air-conveying duct, which means actively convey the aspirated air. This arrangement is elaborate and requires both the provision of technically complex air inlets on the trailing edge, which can easily impair stability, and the provision of at least one air-conveying duct. Furthermore, the boundary layer is not influenced at that point on the suction side at which boundary layer detachment takes place.

WO 2014/064626 A2 discloses an aerodynamic accessory for a wind turbine rotor blade which is configured so as to fit on the inner section and the intermediate section of the wind turbine rotor blade, and which has a trailing edge on the pressure side, a suction side and at least one duct that fluidically connects the pressure side to the suction side.

DE 10 2014 205 016 A1 relates to a rotor blade of a wind turbine having a rotor which, in particular, has an essentially horizontal rotation axis, wherein the rotor blade has a rotor blade shell with a suction side and a pressure side and extends from a root-side end to a rotor blade tip, wherein the rotor blade also has a profile, wherein the profile defines a profile chord which extends from a rotor blade leading edge to a rotor blade trailing edge. The rotor blade is characterized in that there is provided a closable air flow device which provides a closure element in the rotor blade shell, wherein, for the purpose of providing an additional air flow to an air flow prevailing on the suction side and/or pressure side, the closure element is open or opened.

DE 10 2011 056 108 A1 describes a wind turbine blade which contains a permeable window defined in the suction side. The permeable window contains multiple holes defined therein. An air distributor in the internal cavity of the blade is connected in terms of air flow to the permeable window. An inlet air duct in the pressure side of the blade is connected to the air distributor. A movable covering element is configured adjacent to the permeable window and can be moved variably from a completely closed position, in which the air flow through the holes of the permeable window is blocked, to a completely open position, in which an air flow through the holes of the permeable window is established.

US 2016/0177922 describes trailing edge nozzles on a wind turbine rotor blade for the purpose of noise reduction, wherein one or more air nozzles generate respective air jets which are angled radially away from a blunt trailing edge of a wind turbine rotor blade. The jets generate and maintain a radially flowing air flow along the trailing edge, which eliminates vortex shedding. This reduces both drag and noise, meaning that the blades can have a broad, blunt trailing edge which increases buckling resistance and thus makes longer blades possible. The jets can be delivered by air flow from an air inlet in a rotor blade chamber or a stagnation air inlet or a compressor. Each nozzle can be metered individually and/or individually or as a group valve in order to provide a certain air flow to each nozzle relative to the other nozzles. The total air flow to the nozzles can be modulated in reaction to ambient conditions, and can furthermore be modulated cyclically in reaction to an azimuth angle of the rotor blade.

BRIEF SUMMARY

Provided is an improvement to a rotor blade of the above-mentioned type in such a way as to achieve simplified and more efficient boundary layer influencing.

The invention relates to a rotor blade for a wind turbine, having an inner blade section which extends from a rotor blade root in the longitudinal direction of the rotor blade, a trailing edge segment arranged on the inner blade section for the purpose of increasing the chord length of the rotor blade along a section in the rotor blade longitudinal direction, wherein the rotor blade has a pressure-side face and a suction-side face which are respectively locally formed of parts of the inner blade section and of the trailing edge segment.

Provided is a rotor blade having on a pressure-side face and on a suction-side face in a region of the trailing edge segment in each case at least one air inlet and air outlet extending essentially in the rotor blade longitudinal direction, which are fluidically connected to one another, wherein on the suction-side face there is arranged at least one covering element which overlaps the at least one air outlet and by means of which the at least one air outlet can be closed or opened.

Here, the invention uses the knowledge that an in particular slot-type air inlet and air outlet on the pressure-side and suction-side face of the rotor blade creates at least one aspiration region and ejection region which advantageously influences a boundary layer flowing in the chordwise direction of the rotor blade. The air issuing from the air outlet contributes to increasing the kinetic energy in the boundary layer flow. This contributes to overcoming the pressure gradient after passing the maximum curvature in the rear region of the rotor blade profile. Of particular advantage in this context is the fact that the ejection is brought about by passive actuation of the covering element. When the boundary layer flow begins to detach from the suction-side face of the rotor blade, the covering element opens the air outlet. Furthermore, the covering element prevents an aerodynamic short-circuit through the fluidic coupling of the air inlet and air outlet arranged on the mutually opposite sides of the rotor blade. During operation of the wind turbine, the fluidic coupling gives rise to a self-establishing air flow from the air inlet on the pressure side to the air outlet on the suction side of the rotor blade. The covering element prevents uncontrolled ejection or outflowing, which would reduce lift and increase drag.

Thus, the arrangement of at least one trailing edge segment makes it possible to effectively increase the chord length of the rotor blade in the rotor root region. The at least one trailing edge segment extends up to one third of the length of the rotor blade. Full profiling of this region of the rotor blade contributes, cumulatively over the service life of the wind turbine, substantially to the annual energy production (AEP) of the wind turbine, even at low average speeds.

Preferably, the inner blade section has a round or oval profile cross section, which permits simple production and attachment to the rotor hub. The trailing edge segment makes it possible to achieve an aerodynamic effect even in this section where the profile cross section is round or oval.

In comparison to boundary layer aspiration in the region of the trailing edge, possibly even a trailing edge segment arranged at the trailing edge, the air flow is influenced in that region of the rotor blade in which it achieves the greatest effect, namely in the region where the boundary layer begins to detach. Moreover, it is not necessary for the inner blade section to have any bores or structural modifications which could give rise to stability problems.

A slot-type air inlet and air outlet is to be understood as a slot or gap in the surface of the rotor blade, on the pressure-site and suction-side face of the latter, the dimensions of which are greater in the rotor blade longitudinal direction than in the chordwise direction. Preferably, the dimensions of the air inlets and air outlets in the rotor blade longitudinal direction are many times greater than in the chordwise direction. In one embodiment, the dimension in the rotor blade longitudinal direction is at least twice that in the chordwise direction. In another embodiment, the dimension in the rotor blade longitudinal direction is at least 10 times, in particular at least 20 times, particularly preferably at least 50 times that in the chordwise direction.

Here, the at least one air inlet and air outlet can be fluidically connected to one another by the trailing edge segment. The trailing edge segment, which adjoins the inner blade section, can to this end form an enclosed space into which air flows through the air inlet.

In that context, the at least one covering element can be actuable in dependence on a stagnation pressure that becomes established inside the trailing edge segment.

In a preferred development of the rotor blade, the at least one covering element is designed to redirect the air flow in the region of the air outlet essentially parallel to the respectively adjacent outer surface of the inner blade section. The preferred consequence of the redirection is that the discharge or ejection of the air flow is preferably in the direction of the air flow flowing along the suction-side face of the rotor blade. Thus, the boundary layer on the suction-side face of the rotor blade is influenced more simply.

Preferably, in one embodiment of the invention it is provided that the at least one covering element has a first section by means of which the at least one covering element is attached to the inner blade section, and a second section which overlaps the at least one air outlet. The first section, which serves for the attachment, can to this end have a surface that is adapted to the contour of the inner blade section. This serves to largely avoid influences that would disrupt the airflow. In addition, a covering element of this kind is simple to install. The second section can completely or partially overlap the air outlet in the rotor blade longitudinal direction.

In that context, at least the second section of the at least one covering element can be designed to be flexurally elastic. This has the advantage that the closing and opening of the air outlet can be controlled in dependence on the spring stiffness of the material used to produce the covering element.

According to one alternative embodiment, the at least one covering element can be of two-part design. In that context, the first section and the second section can be connected to one another at least locally by a joint. The closing and opening of the air outlet can be influenced by the self-weight of the second section. Alternatively or additionally, it is possible for the joint to be spring-loaded in order to control the response behavior of the second section which serves for closing and opening the air outlet.

One development of the rotor blade provides that each air inlet and air outlet is formed immediately in the transition region from the inner blade section to the trailing edge segment. The upper side, forming a region of the suction-side face, and the underside of the trailing edge segment, forming a region of the pressure-side face of the rotor blade, are shortened, in a simple manner, in the direction of the inner blade section. This produces an interruption in the suction-side and pressure-side face of the rotor blade by means of an edge, on the upper side and underside of the trailing edge segment, that is set back on the inner blade section. Upon affixing of the trailing edge segment to the inner blade portion, the edges of the upper side and underside of the trailing edge segment are thus arranged at a spacing from a respectively assigned region of the inner blade section.

Moreover, the trailing edge segment can accordingly have a first edge and a second edge which bound the pressure-side face and the suction-side face of the trailing edge segment. The first edge and the second edge preferably extend essentially tangentially with respect to the surface of the inner blade section. Preferably, the first edge and the second edge are spaced apart from the inner blade section so as to form the air inlet and/or the air outlet therebetween.

The separation between the first edge and, respectively, the second edge and the inner blade section can be different. Preferably, the separation between the first edge and the inner blade section is greater than the separation between the second edge and the inner blade section. As a result, there forms, on the pressure-side face of the trailing edge segment, a wider gap that forms the air inlet. This leads to an increase in the volumetric flow, or respectively the increase in the outflow velocity at the air outlet.

Furthermore, the trailing edge segment can have a forward edge section which is arranged on the first edge and which extends locally in the circumferential direction of the inner blade section. The forward edge section forms an intake for stagnation pressure recovery. This measure leads to an increase in the volumetric flow, or respectively of the outflow velocity at the air outlet.

Preferably, it is provided, in one embodiment of the invention, that the trailing edge segment consists of at least one contour element that extends locally in the circumferential direction of the inner blade section, and at least one profile element that is arranged at an angle to the contour element on the suction-side face. The profile element is preferably curved.

In that context, the contour element can be attached to and at a radial distance from the surface of the inner blade section by means of webs arranged on that surface. In this regard, the contour element can be matched to the outer shape of the inner blade section. This forms at least one flow duct between the inner blade section and the contour element, which duct fluidically connects the air inlet on the pressure-side face to the air outlet on the suction-side face.

Furthermore, at least one connection element can be arranged or formed between the contour element and the profile element. Depending on the configuration of the at least one connection element, various functions can be assigned thereto. Thus, the at least one connection element can serve to ensure a constant separation between the contour element and profile element. Moreover, the at least one connection element can serve to influence the air flow in this region. The at least one connection element can extend between the surface of the contour element and the underside of the profile element, which faces that surface. In that context, the at least one connection element can be essentially elongate in shape so that the at least one connection element is connected to the contour element and the profile element only in the region of its outer ends. To that end, the connection element can for example be in the shape of a rod or stick. Furthermore, the at least one connection element can be two-dimensional, at least in the plane orthogonal to the contour element and to the profile element, and have a polygonal perimeter. In that context, an outer edge of the connection element that respectively faces the contour element or the profile element is in linear contact. Thus, the connection element can for example be in the form of a triangular web or a rib body. In addition, the at least one connection element can have a rose-thorn profile design. Owing to a thorn broadening of this kind, it is possible not only to keep the chord length in the hub region advantageously small, but also to advantageously influence vortex shedding and thus noise emissions.

Furthermore, the profile element can be designed as a sheet-like segment which can be wound up using a winding device, and which can be braced by means of a batten arranged on the contour element. Advantageously, the winding device is integrated into the trailing edge segment. Configuring the profile element such that it can be wound up has the advantage of simplifying transport owing to reduced dimensions. During installation, the profile element configured as a sheet-like segment can then be pulled out and braced by means of the contouring batten.

In order to increase stability, it is possible for one or more rib bodies to be provided between the batten and the contour element. Preferably, the rib body is connected to the correspondingly arranged sheet-like regions of batten and contour element by means of a force-fitted connection or an integrally bonded connection.

The invention further relates to a wind turbine having a tower, a nacelle and a rotor. The invention also solves the problem underlying the rotor blade by making a rotor blade that is connected to the rotor, conform to one of the above-described preferred embodiments. Such a rotor blade makes it possible to influence the boundary layer on the rotor blade, thus making it possible to improve the efficiency of the wind turbine in a simple manner.

The invention also relates to a wind farm having multiple wind turbines which are designed according to one of the above-described preferred embodiments of the invention.

BRIEF DESCRIPTION OF THE SEVERAL VIEWS OF THE DRAWINGS

The invention is described in more detail below by means of a possible exemplary embodiment and with reference to the appended figures, in which.

DETAILED DESCRIPTION

Although certain features of preferred embodiments are described only with reference to individual exemplary embodiments, the invention also extends to the combination of individual features of the different exemplary embodiments with one another.

Figure 1:
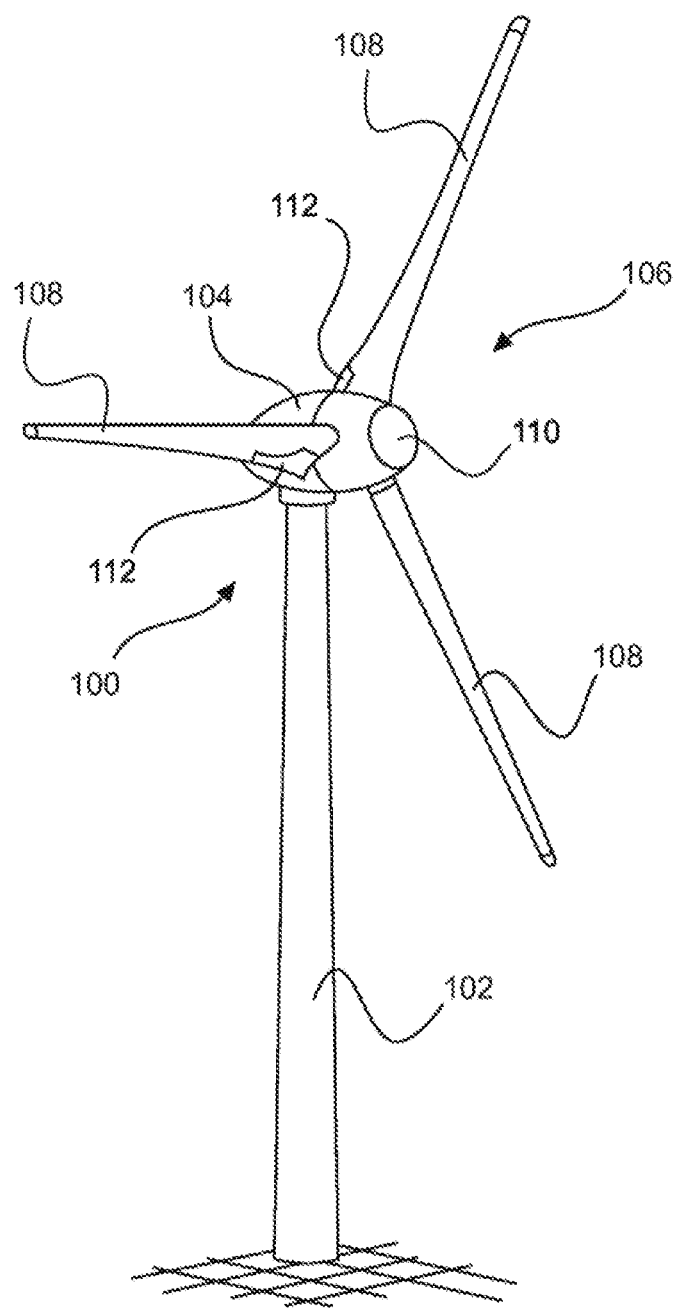
FIG. 1: shows a wind turbine.

FIG. 1 shows a wind turbine 100 with a tower 102 and a nacelle 104. Arranged on the nacelle 104 is a rotor 106 with three rotor blades 108 and a spinner 110. The rotor blades 108 are arranged with their rotor blade root at a rotor hub. During operation, the rotor 106 is set in rotation by the wind and thereby drives a generator (not shown) in the nacelle 104.

The rotor blades 108 each have a trailing edge segment 112, by means of which they are formed as close-fitting rotor blades. Proceeding from the rotor blade root, the at least one trailing edge segment 112 extends in sections in the longitudinal direction of the rotor blade 108. The at least one trailing edge segment 112 extends up to one third of the length of the rotor blade 108.

Figure 2:
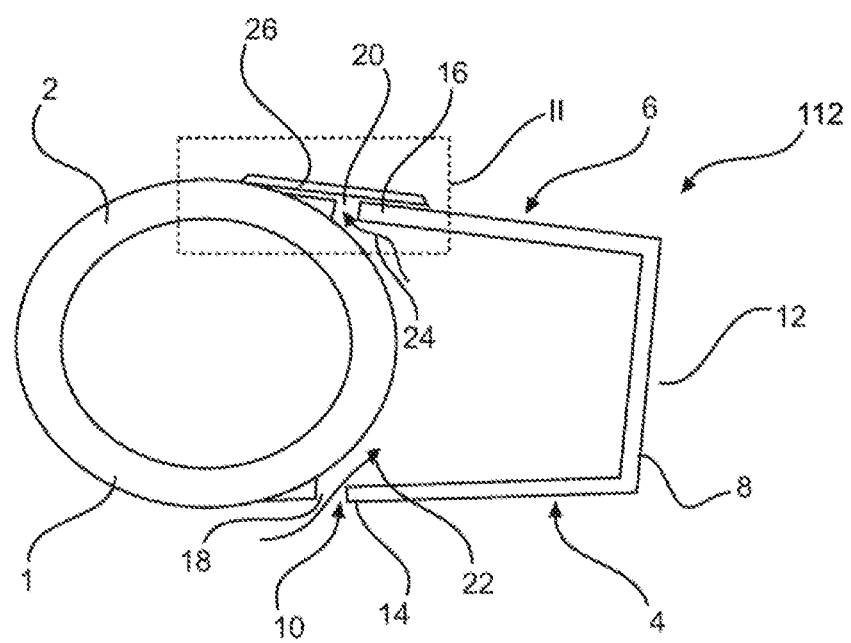
FIG. 2: shows a section view of a rotor blade in the rotor hub region according to a first exemplary embodiment.

FIG. 2 shows a section view of the rotor blade 108 in the rotor hub region, with a trailing edge segment 112 according to a first exemplary embodiment. The rotor blade 108 shown in FIG. 2 has, in an inner blade section 2 which adjoins the rotor blade root 1, the trailing edge segment 112 which extends the chord length of the rotor blade 108. The trailing edge segment 112 has a pressure-side face 4 and a suction-side face 6. In the exemplary embodiment shown, the trailing edge segment 112 is formed as a multi-part profile element and has a segment section 8 which is formed as a foot segment and which has an essentially U-shaped cross section. A rear face 12, running essentially perpendicular between the suction-side and pressure-side faces 4, 6, bounds the segment section 8 of the trailing edge segment 112.

Opposite the rear face 12 there is an open connection side 10 at which the trailing edge segment 112 is arranged on the inner blade section 2 of the rotor blade 108. A first edge 14 and a second edge 16, which bound the suction-side and pressure-side faces 4, 6 of the trailing edge segment 112, run along the connection side 10 of the trailing edge segment 112. The first edge 14 and the second edge 16 are matched to the curvature of the rotor blade 108 and run essentially in the rotor blade longitudinal direction. The first edge 14 and the second edge 16 extend tangentially to the lateral face of the inner blade section 2, in the chordwise direction of the rotor blade 108. In the assembled state, the rear face 12 of the segment section 8 faces a trailing edge (not shown) of that region of the rotor blade 108 which adjoins the inner blade section 2. At least one further segment section adjoins the rear face 10 of the segment section 8. The at least one further segment section forms a part of the trailing edge of the trailing edge segment 112.

In the exemplary embodiment shown, the first edge 14 of the trailing edge segment 112 ends at a distance from the outer face, or outer contour, of the inner blade section 2, as a consequence of which a first gap 18 is formed between the pressure-side face 4 of the trailing edge segment 112 and the inner blade section 2. The first gap 18, which is formed in the transition region from the inner blade section 2 to the trailing edge segment 112, permits aspiration of the boundary layer on the pressure-side face 4 of the rotor blade 108. The first gap 18 forms an in particular slot-like air inlet 22 into the interior of the trailing edge segment 112.

On the suction-side face 6 of the trailing edge segment 112, the second edge 16 of the trailing edge segment 112 also ends at a distance from the outer face, or outer contour, of the inner blade section 2, as a consequence of which a second gap 20 is formed between the pressure-side face 4 of the trailing edge segment 112 and the inner blade section 2. The second gap 20, which is formed in the transition region from the inner blade section 2 to the trailing edge segment 112, allows the air flow taken in through the first gap 18 to flow out on the suction-side face 6 of the rotor blade 108. The second gap 20 forms an in particular slot-like air outlet 24 out of the interior of the trailing edge segment 112. The first gap 18 and the second gap 20 are fluidically connected to one another by the essentially U-shaped segment section 8.

The air outlet 24 on the suction-side face 6 of the trailing edge segment 112 is covered by at least one covering element 26. The covering element 26 is arranged on the inner blade section 2 and extends locally over the suction-side face 6 of the trailing edge segment 112. The extent of the at least one covering element 26 in the longitudinal direction of the rotor blade 108 corresponds to the dimensions of the second gap 20 on the suction-side face 6. For affixing to the inner blade section 2, the covering element 26 has a first section which serves as attachment section 28. The air outlet 26 formed by the second gap 20 is overlapped by a second section of the covering element 26, formed as a covering section 30, as shown in greater detail in the detail view of FIG. 3.

Figure 3:
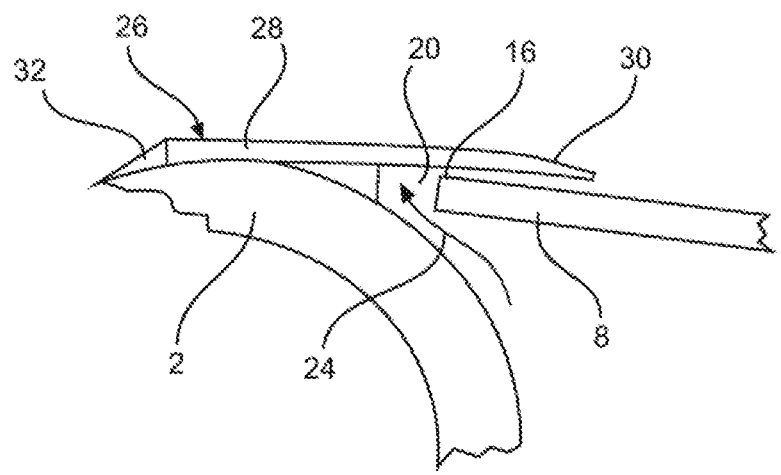
FIG. 3: shows a detail view II from FIG. 2 in a first position of a covering element.

FIG. 3 shows a detail view II from FIG. 2. The covering element 26 is embodied as an essentially planar profile component. The free end, facing the incident flow, of the attachment section 28 has a flattened transition to the surface of the inner blade section 2. To that end, there is provided, in the form of a separate element, a leading edge 32 in order to avoid turbulence in the transition between the surface of the inner blade section 2 and the covering element 26. Alternatively, the free end of the attachment section 28 can have a taper, or a fluidically optimized transition is achieved using a smoothing compound. The free end of the covering element 30 also tapers or flattens.

At least the second section, the covering section 30, of the covering element 26 is made of a flexurally elastic material. The depictions of FIGS. 2 and 3 show the covering element 26 in a position bearing against the surface of the segment section 8. In the bearing position, the air outlet 24 is closed.

Figure 4:
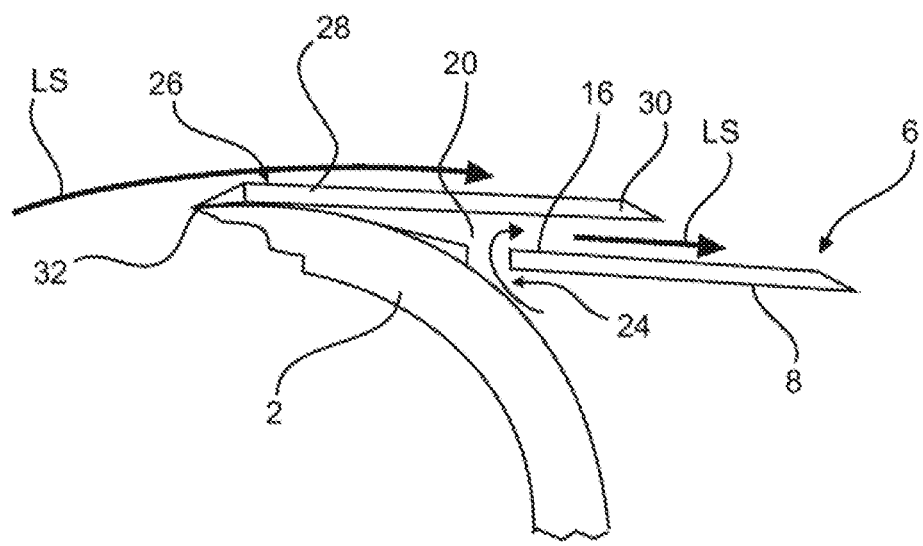
FIG. 4: shows a detail view II from FIG. 2 in a second position of the covering element.

FIG. 4 shows a detail view II from FIG. 2 in a second position of the covering element 26. In this second position, the covering section 30 has been raised by the stagnation pressure building up inside the segment section 8 and by the detachment of the boundary layer flow on the suction-side face 6, so that the air outlet 24 is opened. Thus, the covering section 30 not only opens the air outlet 24 but also, by virtue of its configuration, redirects the air flowing out of the air outlet 24 in such a manner that this air flows out in the flow direction of the airflow LS on the suction-side face 6. Thus, the boundary layer flow on the suction-side face 6 experiences a supply of energy to overcome the pressure difference leading to flow detachment. Covering section 30 of the covering element 26 forms a kind of overpressure valve. When a threshold value for the stagnation pressure within the segment section 8 is exceeded and the covering section 30 temporarily passes from a position closing the air outlet 24 to a position opening the air outlet 24. The threshold value for the stagnation pressure, which leads to opening of the air outlet 24, can be varied inter alia by means of the bending stiffness of the material used for the covering section 30. Another option is for the attachment section 28, which is securely connected to the surface of the inner blade section 2, to be shorter so that the lever arm of the covering section 30 is longer.

Figure 5:
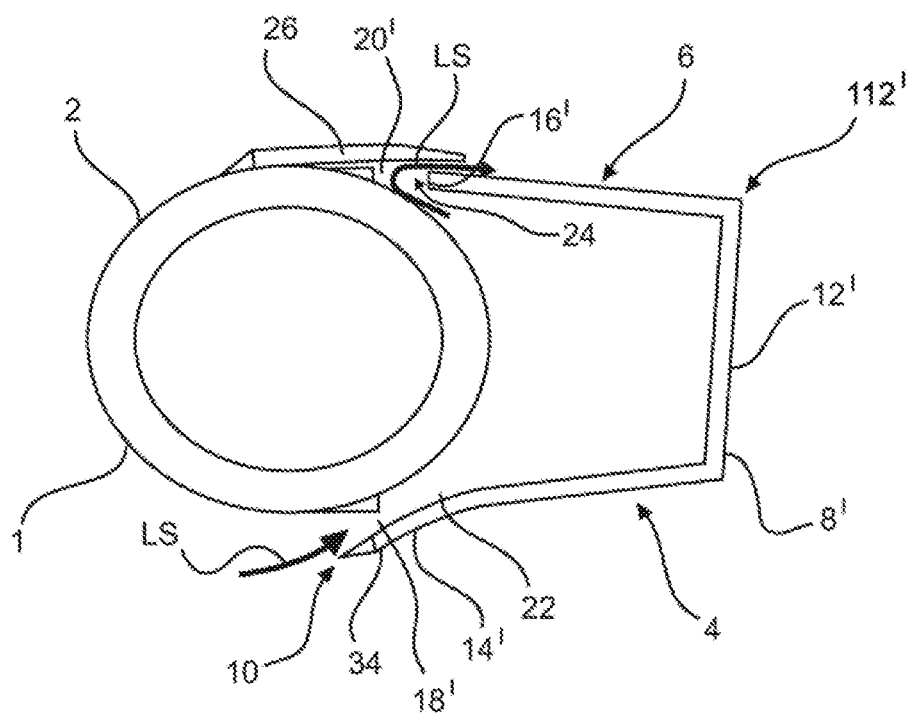
FIG. 5: shows a section view of a rotor blade in the rotor hub region according to a second exemplary embodiment of a trailing edge segment.

The depiction in FIG. 5 shows a second exemplary embodiment of a trailing edge segment 112'. The trailing edge segment 112' has a segment section 8' in the form of a foot segment, with an essentially U-shaped cross section. A rear face 12', running essentially perpendicular between the suction-side and pressure-side faces 4, 6, bounds the segment section 8' of the trailing edge segment 112'. A first edge 14' and a second edge 16', which bound the suction-side and pressure-side faces 4, 6 of the trailing edge segment 112', run along the connection side 10 of the trailing edge segment 112'. This second exemplary embodiment differs in that the first edge 14' has a forward edge section 34 which is locally curved. The forward edge section 34 is locally extended in the circumferential direction of the inner blade section 2. In that context, the forward edge section 34 partially overlaps the lateral face of the inner blade section 2. The forward edge section 34 is formed with a tapering tip in order to reduce turbulence. By means of the shape, matched to the contour of the lateral face of the inner blade section 2, of the first edge 14' in the chordwise direction of the rotor blade 108, the first gap 18' or, respectively, air inlet 22, is enlarged. This has the effect of increasing the air flow supplied to the interior of the segment section 8'. This makes it possible to build up a greater stagnation pressure in the interior of the segment section 8'. The greater stagnation pressure that can be achieved in the segment section 8' by increasing the supplied volume flow of air leads to a higher outflow velocity through the air outlet 24 formed by the second gap 20'. This makes it possible to increase the supply of energy to the boundary layer on the suction-side face 6 of the trailing edge segment 112'.

Figure 6:
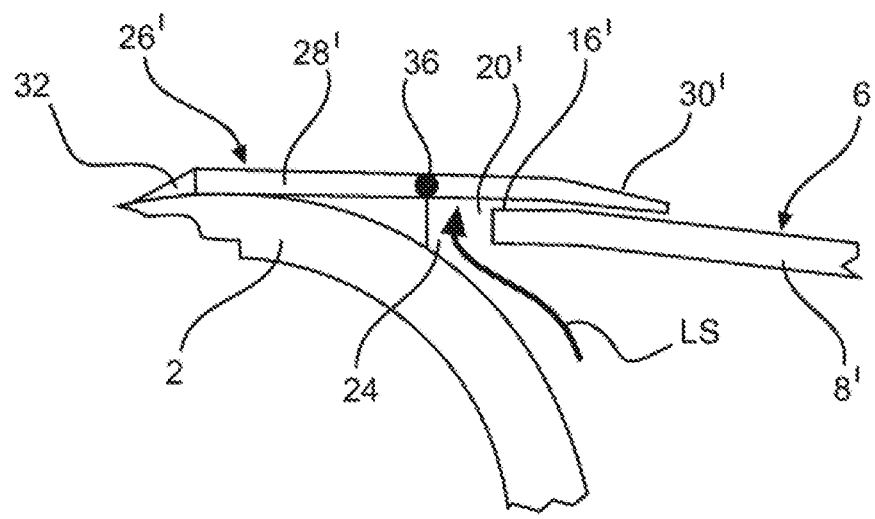
FIG. 6: shows a detail view II from FIG. 2 in a first position of a covering element, according to another exemplary embodiment.

FIG. 6 shows a detail view II from FIG. 2 in a first position of a covering element 26', according to another exemplary embodiment. Whereas the covering element 26 according to the first exemplary embodiment is of one-part design, the covering element 26' in the embodiment depicted in FIG. 6 is of multi-part design. The covering element 26' has an attachment section 28' and a covering section 30'. These are connected to one another by a joint 36. The response behavior of the covering section 30' can be influenced by design measures. Examples include spring-loading in the region of the joint 36 or the self-weight of the covering section 30'.

Figure 7:
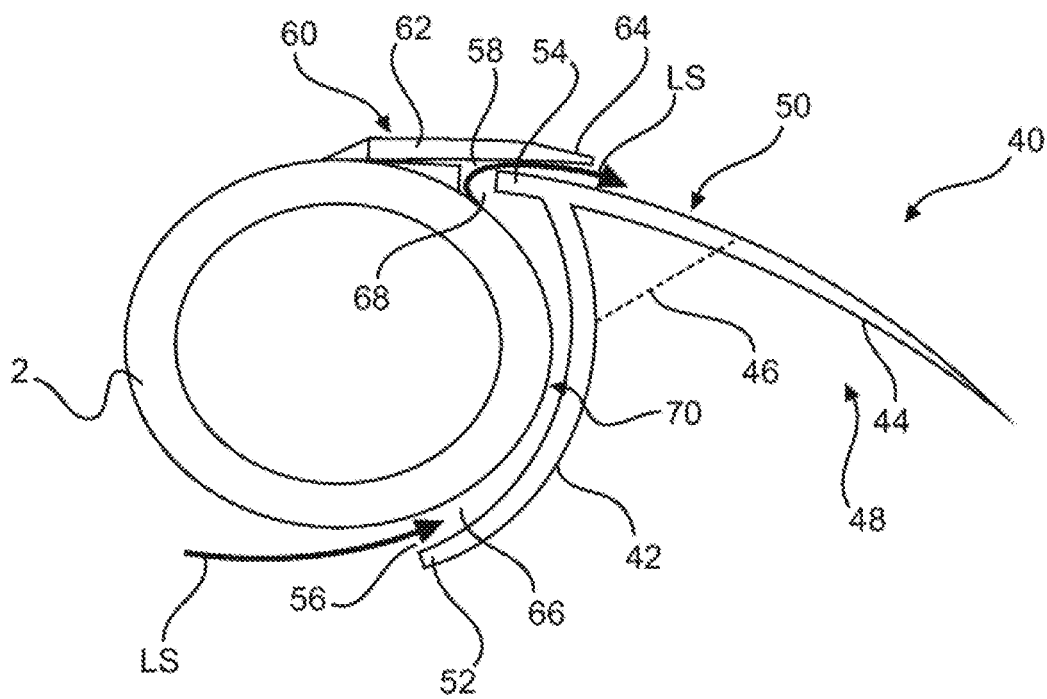
FIG. 7: shows a third exemplary embodiment of a trailing edge segment.
Figure 8:
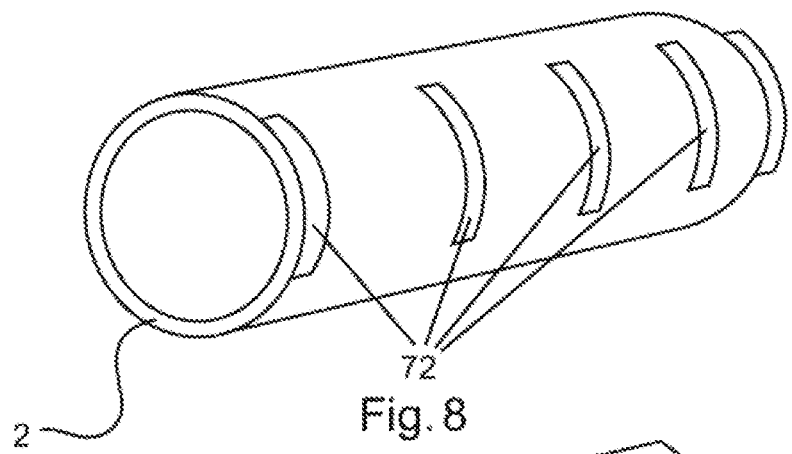
FIG. 8: shows a perspective view of an inner blade section.
Figure 9:
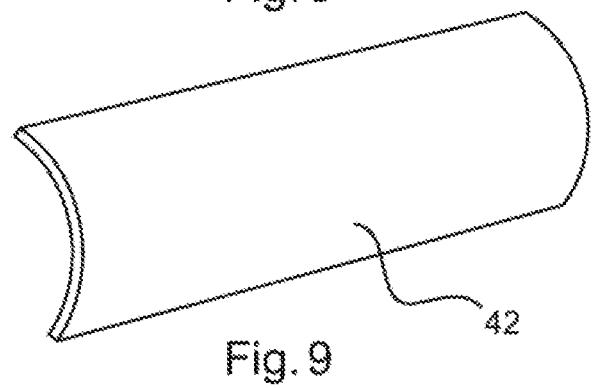
FIG. 9: shows a perspective view of a contour element.

FIGS. 7 to 9 show a further exemplary embodiment of a trailing edge segment 40. The trailing edge segment 40 comprises a contour element 42 and a profile element 44 arranged at an angle to the contour element 42. In particular, the trailing edge segment 40 can be of multi-part design. Between the contour element 42 and the profile element 44 there is arranged a connection element in the form of a rose-thorn profile 46, or a connection element in the form of a rose-thorn profile 46 forms there owing to the configuration of the contour element 42 and the profile element 44. In this context, an outer edge of the connection element, respectively facing the contour element 42 or the profile element 44, bears linearly against the contour element 42 or the profile element 44. Moreover, the at least one connection element can also be formed as a triangular web.

The trailing edge segment 40 has a pressure-side face 48 and a suction-side face 50. The contour element 42 has a first edge 52 and the profile segment 44 has a second edge 54. The first edge 52 runs along the pressure side of the inner blade section 2. The second edge 54 runs along the suction-side face 50 of the rear edge segment 40. The first edge 52 is arranged at a distance from the outer face, or outer contour, of the inner blade section 2, as a consequence of which a first gap 56 is formed between the contour element 42 and the inner blade section 2. The first gap 56, which is formed in the transition region from the inner blade section 2 to the trailing edge segment 40, permits aspiration of the boundary layer on the pressure-side face 48 of the rotor blade 108. The first gap 56 forms an in particular slot-like air inlet 66.

On the suction-side face 50, the second edge 54 of the profile element 44 also ends at a distance from the outer face, or outer contour, of the inner blade section 2, as a consequence of which a second gap 58 is formed between the suction-side face 50 of the profile element 44 and the inner blade section 2. The second gap 58, which is formed in the transition region from the inner blade section 2 to the trailing edge segment 40, allows the air flow taken in through the first gap 56 to flow out on the suction-side face 50 of the rotor blade 108. The second gap 56 forms an in particular slot-like air outlet 68.

The second gap 58 is overlapped by a covering element 60 which has an attachment section 62 and a covering section 64. In that context, the covering section 64 is formed in such a manner that it can close or open the second gap 58, or the air outlet 68, as already explained hereinabove. The radial separation between the outer face, or the outer contour, of the inner blade section 2 and the first edge 52 can be chosen to be greater than the separation between the outer face, or the outer contour, of the inner blade section 2 and the second edge 54.

The trailing edge segment 40 is arranged on the inner blade section 2. To this end, the inner blade section 2, designed as a winding part, has on its lateral face multiple webs 72. The webs 72 are preferably arranged equidistant next to one another. The contour element 42 is arranged on the webs 72. The radial separation between the outer face, or the outer contour, of the inner blade section 2 and the contour element 42 produces, in each case between the webs 72, a flow duct 70. The respective flow duct 70 is bounded in the circumferential direction by the contour element 42. The flow ducts 70 fluidically connect the slot-shaped air inlet 66 to the slot-shaped air outlet 68.

Figure 10:
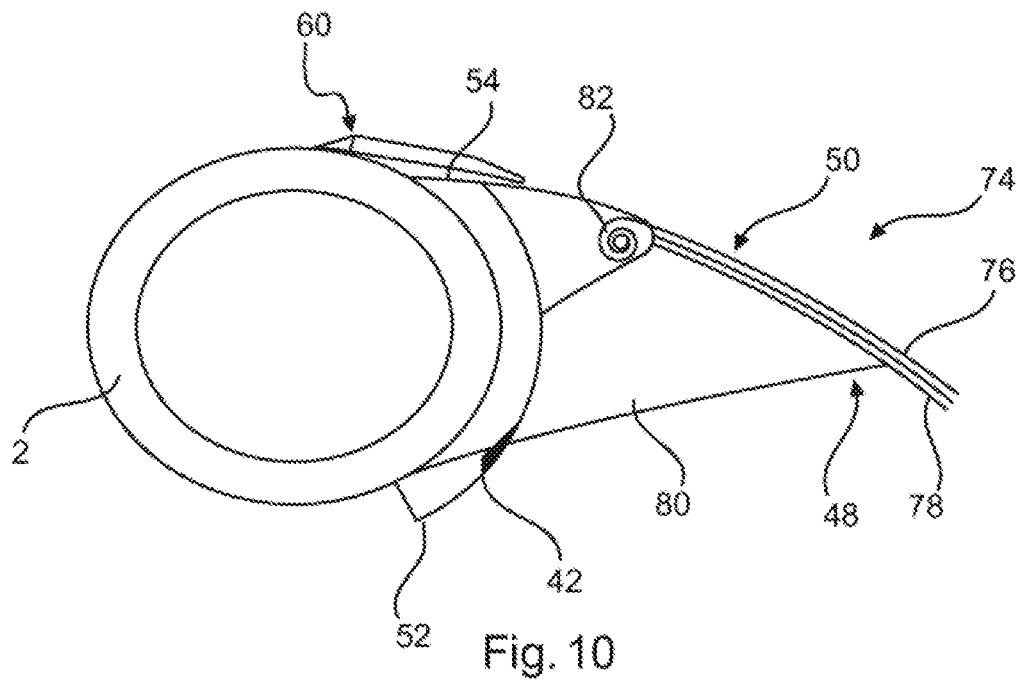
FIG. 10: shows a fourth exemplary embodiment of a trailing edge segment.

FIG. 10 shows another exemplary embodiment of a trailing edge segment 74. In this case, the depiction is kept simplified but essentially corresponds to the exemplary embodiment depicted in FIGS. 7 to 9. According to this exemplary embodiment, the trailing edge segment 74 comprises a contour element 42 which is arranged on the webs 72 of the inner blade section 2. Moreover, the trailing edge segment 74 comprises a profile segment 44 formed as a sheet-like segment 76, which can be wound onto or unwound from a winding device 82 integrated into the interior of the trailing edge segment 74. A batten 78 is provided as a contouring means, on which batten the drawn-out sheet-like segment 76 is tensioned and thus provided with its wing-like shape. In order to stiffen the trailing edge segment 74, there are provided one or more rib bodies 80 in the form of connection elements. The rib bodies 80 are connected to the contour element 42 and to the batten 78 by one or more attachment points. When a tensile load acts on the sheet-like element 76, and the batten 78 is preloaded, the rib bodies 80 can be designed as cable tension elements.

LIST OF REFERENCE SIGNS

1 Blade root
2 Inner blade section
4 Suction-side face
6 Pressure-side face
8, 8' Segment section
10 Connection side
12, 12' Rear face
14, 14' First edge
16, 16' Second edge
18, 18' First gap
20, 20' Second gap
22 Air inlet
24 Air outlet
26, 26' Covering element
28, 28' Attachment section
30, 30' Covering section
32 Leading edge
34 Forward edge section
36 Joint
40 Trailing edge segment
42 Contour element
44 Profile segment
46 Rose-thorn profile
48 Pressure-side face 50 Suction-side face
52 First edge
54 Second edge
56 First gap
58 Second gap
60 Covering element
62 Attachment section
64 Covering section
66 Air inlet
68 Air outlet
70 Flow duct
72 Web
74 Trailing edge segment
76 Sheet-like segment
78 Batten
80 Rib body
82 Winding device
100 Wind turbine
102 Tower
104 Nacelle
106 Rotor
108 Rotor blade
110 Spinner
112, 112' Trailing edge segment
LS Air flow

The invention claimed is:

1. A rotor blade for a wind turbine, comprising:
an inner blade section extending from a rotor blade root in a longitudinal direction of the rotor blade, and a trailing edge segment arranged on the inner blade section thereby increasing a chord length of the rotor blade along a portion of the longitudinal direction of the rotor blade,
wherein the rotor blade has a pressure-side face and a suction-side face, which are respectively formed of parts of the inner blade section and of the trailing edge segment,
wherein, on the pressure-side face and on the suction-side face of the rotor blade is at least one pair of air inlet and air outlet, respectively, wherein the air inlet and air outlet of each pair are fluidically coupled to one another,
wherein at least one covering element is arranged at the suction-side face, wherein the at least one covering element overlaps the air outlet of a respective one of the at least one pair and is configured to close or open the respective air outlet, and
wherein the at least one covering element creates a channel with the suction-side face that is configured to redirect an air flow in a region of the air outlet essentially parallel to the suction-side face.

2. The rotor blade as claimed in claim 1, wherein the at least one pair of air inlet and air outlet are fluidically coupled to one another by the trailing edge segment.

3. The rotor blade as claimed in claim 2, wherein the at least one covering element is actuable in dependence on a stagnation pressure that builds up inside the trailing edge segment.

4. The rotor blade as claimed in claim 1, wherein the at least one covering element has a first section, wherein the at least one covering element is attached to the inner blade section by the first section, and wherein the at least one covering element has a second section that overlaps the respective air outlet.

5. The rotor blade as claimed in claim 4, wherein the second section of the at least one covering element is elastic.

6. The rotor blade as claimed in claim 4, wherein the at least one covering element is a two-part design, wherein the first and second sections are connected to one another at least locally by a joint.

7. The rotor blade as claimed in claim 6, wherein the first section and the second section are coupled together by a joint.

8. The rotor blade as claimed in claim 1, wherein the trailing edge segment has a first edge and a second edge, wherein the first edge and the second edge bound the pressure-side face and the suction-side face of the trailing edge segment.

9. The rotor blade as claimed in claim 8, wherein the trailing edge segment has a forward edge section arranged on the first edge, wherein the forward edge section extends in a circumferential direction of the inner blade section.

10. The rotor blade as claimed in claim 1, wherein the at least one pair of air inlet and air outlet is located in a transition region between the inner blade section and the trailing edge segment.

11. The rotor blade as claimed in claim 1, wherein the trailing edge segment includes at least one contour element that extends in a circumferential direction of the inner blade section, and at least one profile element that is arranged at an angle to the contour element on the suction-side face.

12. The rotor blade as claimed in claim 11, wherein the contour element is configured to be attached to and at a radial distance from a surface of the inner blade section by webs arranged on the surface of the inner blade section.

13. The rotor blade as claimed in claim 11, wherein at least one connection element is arranged or formed between the contour element and the profile element.

14. The rotor blade as claimed in claim 13, wherein the at least one connection element is a triangular web.

15. The rotor blade as claimed in claim 11, wherein the profile element is a sheet-like segment configured to be wound up using a winding device and is configured to be braced by a batten arranged on the contour element.

16. The rotor blade as claimed in claim 15, wherein one or more rib bodies are between the batten and the contour element.

17. A wind turbine comprising:
a tower, a nacelle, a rotor, and at least one rotor blade as claimed in claim 1 coupled to the rotor.

18. A wind farm comprising:
a plurality of wind turbines, at least one of the plurality of wind turbines being a wind turbine as claimed in claim 17.

* * * * *